R. P. REDIFER.
SAW SET.
APPLICATION FILED JUNE 11, 1908.
930,616.  Patented Aug. 10, 1909.
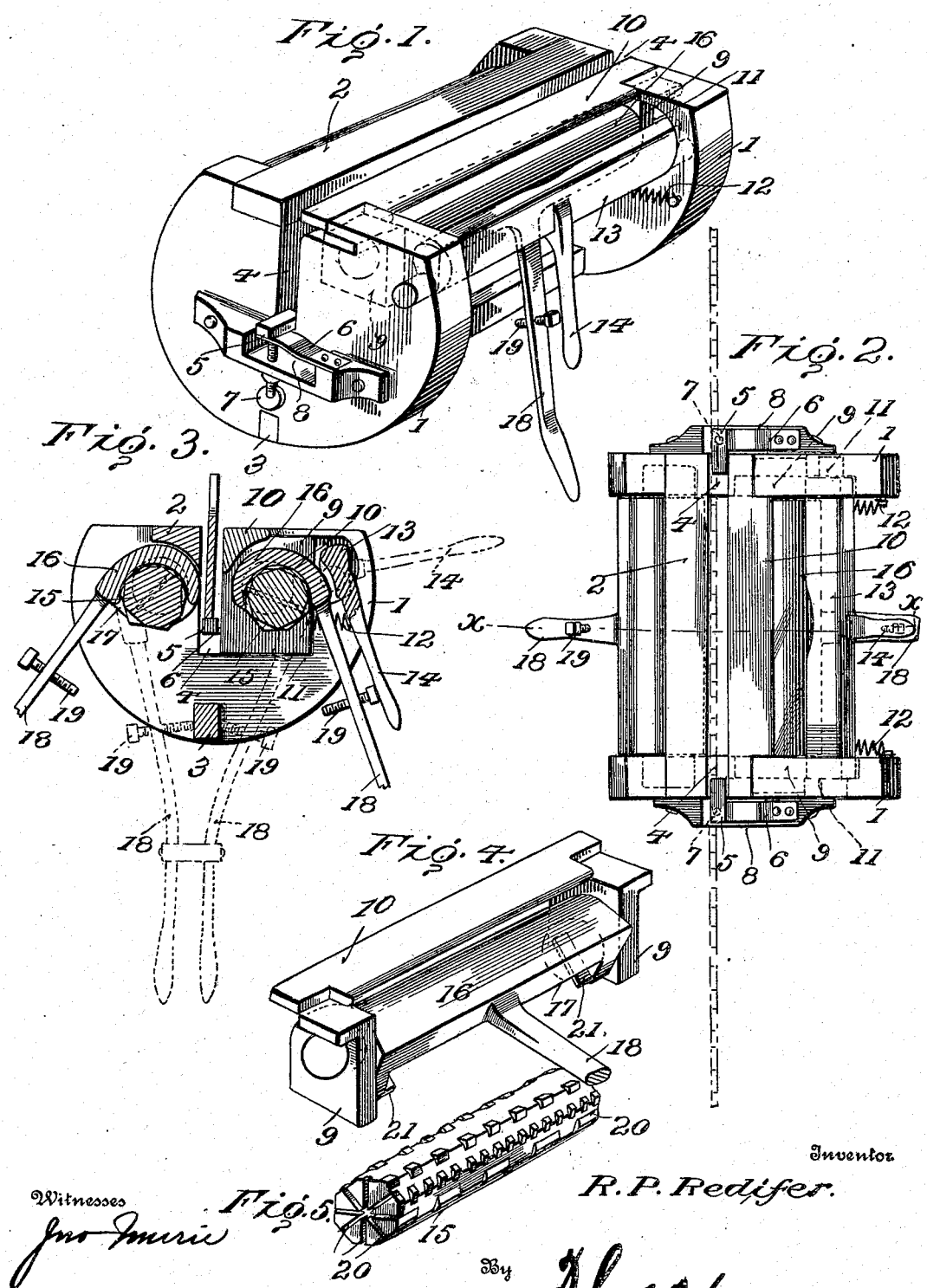
Witnesses  Inventor
R. P. Redifer.
By ............., Attorneys

UNITED STATES PATENT OFFICE.

ROBERT P. REDIFER, OF RIDDLES, OREGON.

SAW-SET.

No. 930,616.   Specification of Letters Patent.   Patented Aug. 10, 1909.

Application filed June 11, 1908.   Serial No. 437,893.

*To all whom it may concern:*

Be it known that I, ROBERT P. REDIFER, a citizen of the United States, residing at Riddles, in the county of Douglas and State of Oregon, have invented certain new and useful Improvements in Saw-Sets, of which the following is a specification.

The present invention is intended to provide a novel device for setting the teeth of saws and which in its organization comprises a clamp and oppositely disposed sets which are adapted to be simultaneously actuated so as to set the teeth alike upon both sides of the saw, each set comprising an adjustable roller having a plurality of set faces and a carrier for each set roller.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a saw set embodying the invention. Fig. 2 is a top plan view thereof. Fig. 3 is a transverse section on the line $x$—$x$ of Fig. 2, the operation of the movable parts being shown by full and dotted lines. Fig. 4 is a detail perspective view of the carrier provided with the movable saw clamp member and the movable set roller frame. Fig. 5 is a detail perspective view of one of the set rollers.

Corresponding and like parts are referred to in the following description and indicated in all the views of the drawings by the same reference characters.

The frame of the set comprises end pieces 1 and connecting bars 2 and 3. The connecting bar 2 also serves as the fixed member of the saw clamp. Slots 4 extend inward from the upper edges of the end pieces 1 and receive the toothed edge of the saw to be set. The slots 4 are in vertical line with the connecting bar 3 and which is of advantage as will appear hereinafter. Gage pieces 5 are arranged at the inner ends of the slots 4 and are adjustable to regulate the entrance of the toothed portion of the saw into the slots 4. Spring arms 6 support the gage pieces 5 and have connection with the end pieces 1, their free ends being adjustable by means of set screws 7 threaded into projections 8 at the outer sides of the end pieces 1. The projections 8 are depressed in their upper sides and the spring arms 6 overhang the depressions and are secured at one end to said projections at one side of the depressions formed therein.

A carrier is loosely mounted between the end pieces 1 and consist of end blocks 9 and a connecting bar 10, the latter being arranged opposite to the connecting bar 2 and acting jointly therewith to clamp the saw when the device is placed in position thereon for setting the teeth. The connecting bar 10 constitutes the movable clamp member. The end pieces 1 have recesses 11 in which the end blocks 9 are fitted, said recesses 11 being at one side of the slots 4. The carrier is moved toward the connecting bar 2 by means of a cam lever and is moved away from said connecting bar by means of springs 12. The hand lever comprises an eccentric bar 13 and a handle 14. The bar 13 is journaled at its ends in opposite corner portions of the end pieces 1 and is adapted to engage with the end blocks 9 so as to force the carrier inward upon operating the handle 14 when it is required to clamp the saw preliminary to setting the same.

The saw setting mechanism comprises like parts, the one being journaled to the end pieces 1 of the main frame and the other being journaled to the end blocks 9 of the carrier. Each part consists of a set roller 15 and a frame 16. Each frame 16 is provided at its ends with journals and is formed in a side with a recess 17 in which the set roller 15 is fitted. A handle 18 projects downward from each frame 16, said handles passing upon opposite sides of the bar 3 and which handle having a set screw 19 to engage with the bar 3 and limit the turning of the frames 16 when operated to set the saw teeth. It will thus be understood that the bar 3, besides serving to connect the end pieces 1, also acts as a stop to limit the closing of the handles 18 and the action of the set rollers upon the saw teeth. The set rollers are of polygonal form, the several sides or faces being notched to provide active portions for different gages of saw teeth, said set rollers being adapted to be turned in their frames 16 to bring the required portion in position to suit the nature of the saw to be set. A series of radial grooves 20 are formed in the ends of the set rollers and are adapted to receive ribs 21 at the ends of the recesses 17, thereby fixing the position of the set rollers and preventing their turning when subjected to strain, as when in operation.

It is observed that one of the members or parts of the saw set and a member of the saw clamp are mounted upon a movable carrier which is actuated by the cam lever to clamp the saw and properly position the parts of the saw set preliminary to operation of the setting mechanism. The saw to be set has its toothed portion inserted in the slots 4, the extent of the insertion being regulated by means of the gage pieces 5 in the manner herein stated. Upon operating the handle 14, the saw is clamped between the members 2 and 10, after which the handles 18 are pressed together until the set screws 19 engage with the bar 3. As the handles 18 are pressed together, the frames 16 are turned upon their journals and since the set rollers 15 have an eccentric arrangement with reference to the axes of their respective frames 16, said set rollers are brought together by a cam action and set the teeth of the saw, as will be readily understood.

Having thus described the invention, what is claimed as new is:

1. In a saw set, the combination of a frame comprising end pieces provided with slots to receive the toothed portion of the saw, a saw clamp member and a set member arranged upon one side of said slots, a carrier located upon the opposite side of said slots, a second saw clamp member and saw set member fitted to said carrier, and operating means for the carrier to bring the coöperating saw clamp members and saw set parts in coöperative position.

2. In a saw set, the combination of a frame provided with a saw receiving slot, frames journaled upon opposite sides of the saw receiving slot, a set roller fitted to each of said frames and disposed eccentrically to the axis thereof, said set rollers being angular in cross section and having their several faces notched to provide active portions for different gages of saw teeth, and means for turning the frames upon their axes to force the active portions of the set rollers into engagement with the teeth of saws.

3. In a saw set, the combination of a frame having a saw receiving slot and provided with a relatively stationary clamp member, a second frame mounted upon the main frame and provided with a movable clamp member, means for moving the second frame toward or away from the stationary clamp member to advance or retract the movable clamp member, a set member carried by said second member, and means for moving the set member independently of the supporting frame.

4. In combination, a frame having a recess in its side and having ribs at the end walls of the recesses, and a set roller having a plurality of set faces and having grooves to match and coöperate with the ribs of the frame to hold the set roller with a selected face in proper position.

5. In a saw set, the combination of a frame provided with a saw receiving slot, set rollers arranged upon opposite sides of said saw receiving slot and mounted upon the frame and having a plurality of set faces each having differently spaced notches to provide for adapting the device to saws having differently spaced teeth, means for setting said rollers and securing the same in adjusted position with a selected set face in proper position, and means for advancing and separating said set rollers.

6. In a saw set, the combination of a frame having a saw receiving slot and provided with a relatively stationary clamp member, a carrier movably mounted upon the frame and provided with a movable clamp member at one side of the said saw receiving slot, a second frame journaled in the carrier, a cam lever for moving the carrier toward said stationary clamp member, a set member carried by said second frame and disposed eccentrically to the axis of said second frame, and means for retracting the carrier when the cam lever is released.

7. A saw set comprising a frame having a stationary clamp member and comprising connected end pieces provided with saw receiving slots, a carrier slidably mounted between said end pieces on one side of the saw receiving slots and having a movable clamp member, a cam lever comprising a bar and handle mounted between said end pieces and adapted to operate said carrier for moving the latter in the direction of the stationary clamp member, a set member mounted directly upon the main frame on the opposite side of the saw receiving slots, and a coöperating set member mounted upon the carrier.

In testimony whereof I affix my signature in presence of two witnesses.

ROBERT P. REDIFER. [L. S.]

Witnesses:
THEODORE W. JOHNSON,
S. S. CATCHING.